United States Patent
Cencer

(10) Patent No.: US 8,961,083 B2
(45) Date of Patent: Feb. 24, 2015

(54) SYSTEM AND METHOD FOR RESTRAINING A VEHICLE WITH A COLLISION RELEASE MECHANISM

(71) Applicant: Robert James Cencer, Tipton, MI (US)

(72) Inventor: Robert James Cencer, Tipton, MI (US)

(73) Assignee: Trinity Parts & Components, LLC, Dallas, TX (US)

( * ) Notice: Subject to any disclaimer, the term of this patent is extended or adjusted under 35 U.S.C. 154(b) by 0 days.

(21) Appl. No.: 13/751,390

(22) Filed: Jan. 28, 2013

(65) Prior Publication Data

US 2014/0212239 A1 Jul. 31, 2014

(51) Int. Cl.
*B60P 7/08* (2006.01)
*B60P 3/075* (2006.01)

(52) U.S. Cl.
CPC ............... *B60P 7/0846* (2013.01); *B60P 3/075* (2013.01); *B60P 7/0861* (2013.01)
USPC ........ 410/20; 410/9; 410/10; 410/12; 410/30; 410/100

(58) Field of Classification Search
CPC .......... B60P 3/077; B60P 3/079; B60P 3/075; B60P 3/073; B60P 7/083; B60P 7/0892; B60T 3/00
USPC ............. 410/9, 10, 11, 12, 16, 19, 20, 23, 30, 410/100, 103; 254/217, 223; 188/32; 248/499
See application file for complete search history.

(56) References Cited

U.S. PATENT DOCUMENTS

| | | | |
|---|---|---|---|
| 5,180,262 A | 1/1993 | Westerdale | |
| 5,277,407 A | 1/1994 | Mayne et al. | |
| 6,742,972 B2 * | 6/2004 | Brunet | 410/103 |
| 7,824,138 B2 * | 11/2010 | Bullock | 410/10 |
| 2004/0144964 A1 | 7/2004 | Boice | |
| 2013/0280001 A1 | 10/2013 | Tatina et al. | |

OTHER PUBLICATIONS

International Search Report and Written Opinion; PCT/US2014/012987; pp. 9 May 8, 2014.

* cited by examiner

*Primary Examiner* — Stephen Gordon
(74) *Attorney, Agent, or Firm* — Baker Botts L.L.P.

(57) ABSTRACT

A vehicle restraint system includes a strap assembly configured to be positioned on a portion of a tire of a vehicle to secure the vehicle to a deck of a transport. The strap assembly is also configured to be coupled to the deck of the transport on a first side of the tire of the vehicle. The system also includes a mandrel assembly operable to be coupled to the strap assembly on a second side of the tire of the vehicle, opposite the first side. The system further includes a winch assembly configured to be coupled to the deck of the transport and the mandrel assembly on the second side of the tire of the vehicle, the winch assembly configured to rotate the mandrel assembly to produce a tightening force to tighten the strap assembly around the portion of the tire. The system still further includes a release mechanism disposed between the winch assembly and the mandrel assembly and configured to create a coupling between the winch assembly and the mandrel assembly in a manner that transmits the tightening force from the winch assembly to the mandrel assembly. The release mechanism is configured to release the coupling between the winch assembly and the mandrel assembly when a force greater than or equal to a predetermined force is produced against the release mechanism.

14 Claims, 12 Drawing Sheets

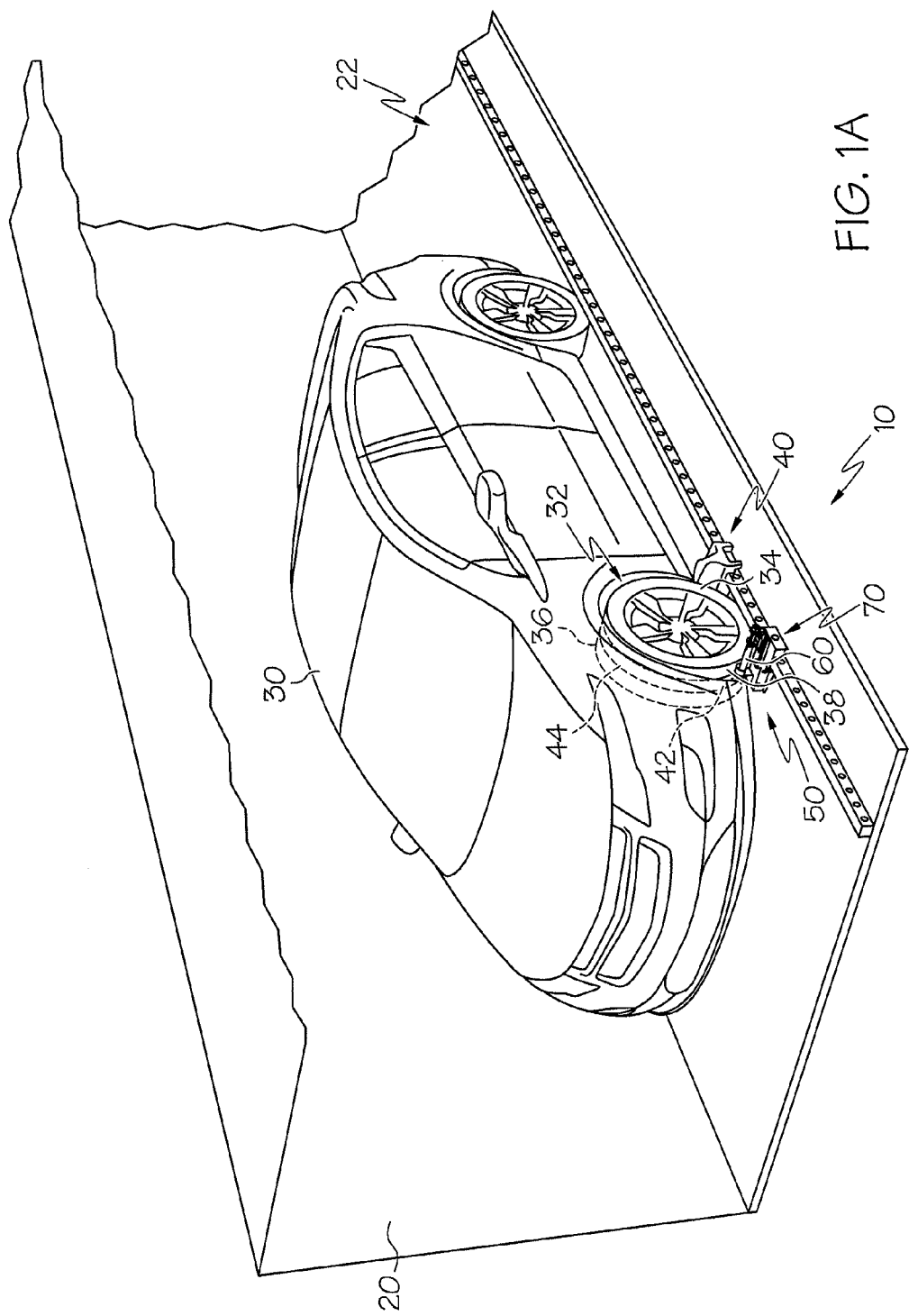

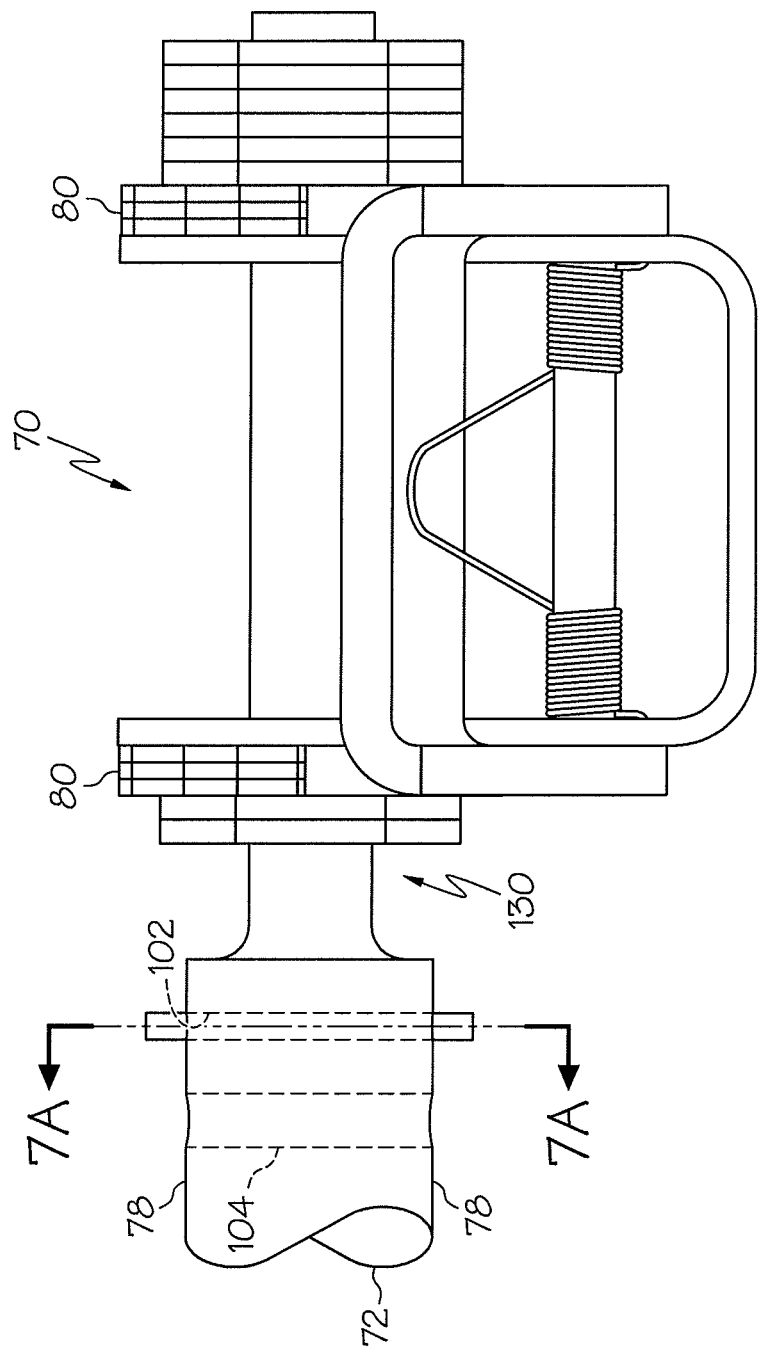

SYSTEM AND METHOD FOR RESTRAINING A VEHICLE WITH A COLLISION RELEASE MECHANISM

BACKGROUND OF THE INVENTION

1. Field of the Invention

The disclosure relates generally to restraining a vehicle, and more particularly to systems and methods for restraining a vehicle with a collision release mechanism.

2. Description of Related Art

Consumer demand for fuel efficient cars has forced vehicle manufacturers to produce lighter vehicles. Older vehicles have heavy and strong suspensions. Newer passenger vehicles, sport utility vehicles, crossovers, minivans, and light trucks are designed with lighter and weaker suspensions in order to reduce weight and increase fuel economy.

Such new vehicle suspensions are often damaged by impacts sustained during shipping with traditional restraints. For example, during recommended operations, railway car switching and coupling occurs between trains traveling at under four miles per hour. Both light and heavy vehicle suspensions are typically strong enough to sustain these impacts without damage when restrained by traditional restraining methods such as wheel-chocks and straps attached to the deck of the railway car. Impacts sometimes occur between railway cars traveling at higher speeds, for example, above eight miles per hour. The heavy suspensions usually sustain these impacts, but light suspensions often give way, causing suspension mis-alignment and damage. These problems often go undetected and are exacerbated by routine driving, which results in premature and possibly catastrophic suspension failure during use.

SUMMARY OF THE INVENTION

According to one configuration, a vehicle restraint system includes a strap assembly configured to be positioned on a portion of a tire of a vehicle to secure the vehicle to a deck of a transport. The strap assembly is also configured to be coupled to the deck of the transport on a first side of the tire of the vehicle. The system also includes a mandrel assembly operable to be coupled to the strap assembly on a second side of the tire of the vehicle, opposite the first side. The system further includes a winch assembly configured to be coupled to the deck of the transport and the mandrel assembly on the second side of the tire of the vehicle, the winch assembly configured to rotate the mandrel assembly to produce a tightening force to tighten the strap assembly around the portion of the tire. The system still further includes a release mechanism disposed between the winch assembly and the mandrel assembly and configured to create a coupling between the winch assembly and the mandrel assembly in a manner that transmits the tightening force from the winch assembly to the mandrel assembly. The release mechanism is configured to release the coupling between the winch assembly and the mandrel assembly when a force greater than or equal to a predetermined force is produced against the release mechanism.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

FIG. 1A illustrates a perspective view of a vehicle restraint system in a railway car in accordance with a particular configuration.

FIG. 6 illustrates a front view of the winch assembly in the vehicle restraint system of FIG. 1A.

DETAILED DESCRIPTION

Preferred embodiments of the present invention, and their features and advantages, may be understood by referring to FIGS. 1-7, like numerals being used for corresponding parts in the various drawings.

Figure 1B:
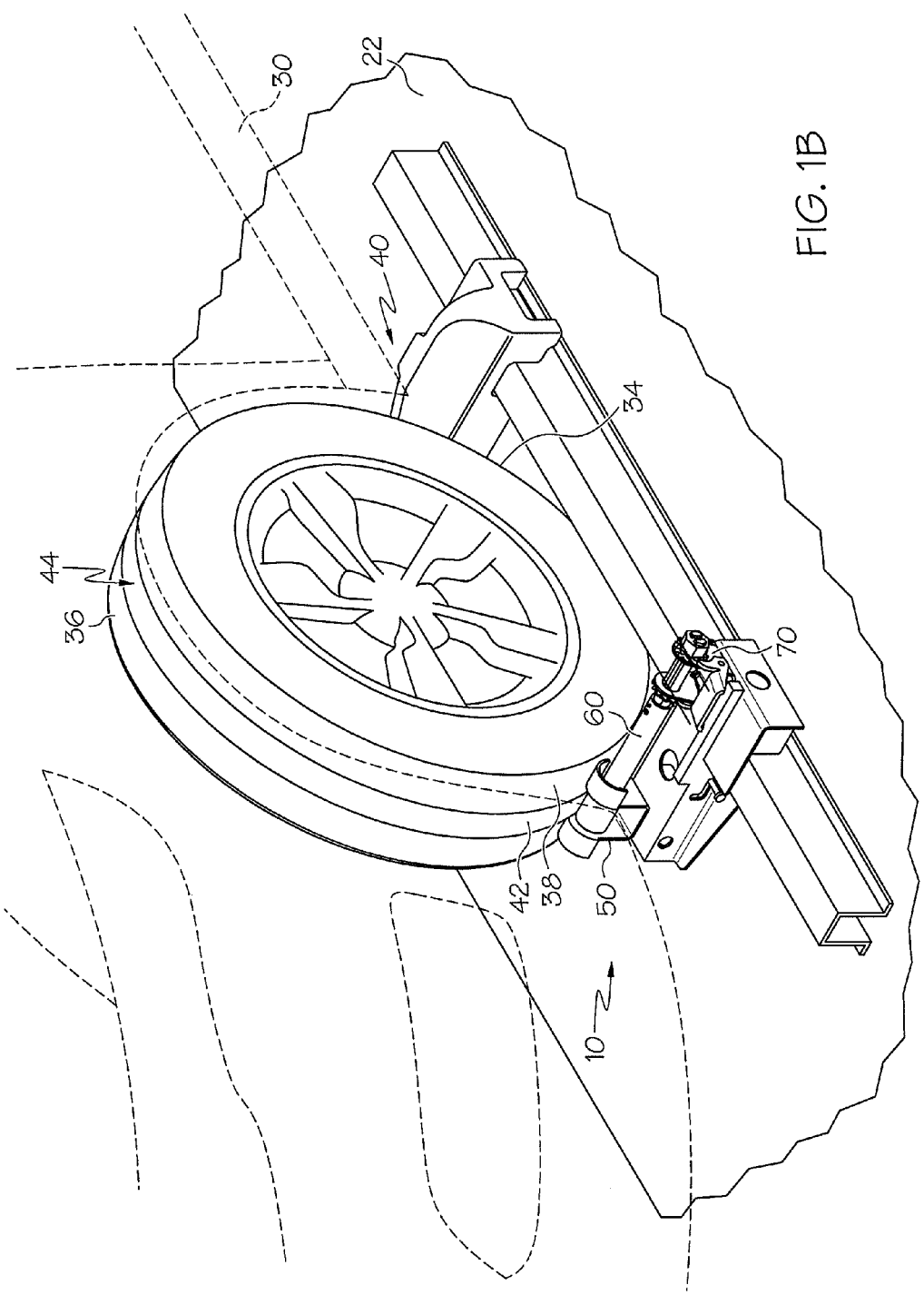
FIG. 1B illustrates a close up perspective view of the vehicle restraint system of FIG. 1A.

FIGS. 1A and 1B illustrate a diagram of a vehicle restraint system 10 for restraining a vehicle with a collision release mechanism as implemented in a tri-level freight shipping railway car 20. In a particular embodiment, railway car 20 regularly applies incidental forces on vehicle 30 during shipping operations due to one or more of acceleration, deceleration, and coupling with other railway cars. Railway car 20, less frequently, applies more extreme forces on vehicle 30 during shipping operations due to high impact collisions (e.g., collisions with other railway cars, high-speed coupling, emergency stops, and railway car failure). Such extreme forces may be transferred directly to the suspension of vehicle 30 when vehicle 30 is restrained using industry standard restraints. Such extreme forces may permanently damage the suspension of vehicle 30, often in a manner that is difficult to detect. Vehicle restraint system 10 may be configured to statically restrain vehicle 30 when incidental forces are applied, but may release vehicle 30 once a predetermined force threshold is reached or exceeded. For reasons discussed below in more detail, releasing vehicle 30 once a force threshold is reached or exceeded may reduce hidden suspension damage, wear, and other problems that are caused by such extreme movement in railway cars. In addition, vehicle restraint system 10 may allow for one or more of additional railway car height clearance, retrofitting of various components associated with existing restraint systems, installation, and maintenance.

In the depicted embodiments, vehicle restraint system 10 includes a strap assembly 40, which is coupled to a deck 22 of railway car 20, is disposed flush to the base of a tire 32 on a first side 34 of tire 32, and wraps around a portion 36 of tire 32. Further, vehicle restraint system 10 includes a mandrel assembly 50, which is disposed flush to the base of a second side 38 of tire 32. Mandrel assembly 50 is coupled to deck 22 of railway car 20, and to an end 42 of strap assembly 40. Vehicle restraint system 10 includes a release mechanism 60, which may be disposed adjacent to mandrel assembly 50. Vehicle restraint system 10 also includes a winch assembly 70, which may be disposed adjacent to release mechanism 60 and may be coupled to deck 22 of railway car 20.

As used herein, "inboard" refers to one or more locations inside or on a line drawn between the exterior portions of one or more tires of a vehicle, such as in front of the rear tire or in rear of the front tire. As used herein, "outboard" refers to one or more locations outside of such line, such as in rear of the rear tire or in front of the front tire.

As used herein, "envelope" of a vehicle refers to an outer boundary around the exterior portion of the vehicle.

As used herein, "latent damage" refers to damage to a vehicle that is not visible on the exterior of the vehicle.

A strap assembly belt 44 may feed into mandrel assembly 50 such that it may be tightened against portion 36 of tire 32 by rotating a winch assembly axle of winch assembly 70. For example, the winch assembly axle is coupled to release mechanism 60 and is disposed adjacent to release mechanism 60. Release mechanism 60 is coupled to a mandrel assembly axle of mandrel assembly 50. Release mechanism 60 is set to relay the tightening force from winch assembly 70 to mandrel assembly 50, such that it allows vehicle restraint system 10 to hold tire 32, and accordingly vehicle 30, in place. Strap assembly belt 44 may be composed of one or more of nylon, rubber, and cloth.

Release mechanism 60 may include a mandrel coupling rod and a release threshold mechanism. In one embodiment, the mandrel coupling rod is disposed adjacent to the winch assembly on one side. The mandrel coupling rod is disposed adjacent to the mandrel assembly axle on another side and is coupled to the mandrel assembly axle. The mandrel coupling rod includes a collar with an interior diameter greater than an exterior diameter of the winch assembly axle. The mandrel coupling rod and the winch assembly axle are disposed adjacent to each other and are configured such that the collar of the mandrel coupling rod covers an end of the winch assembly axle. The mandrel coupling rod allows winch assembly 70 to be disposed outside the envelope of vehicle 30, which provides unobstructed access for manual operation when tightening and releasing strap assembly 40 while loading and unloading vehicle 30.

Release mechanism 60 may have a predetermined release threshold. In particular configurations, the release threshold is based on the modulus of a shear pin. The shear pin may include one or more of a rod and a bolt inserted radially through shear pin holes formed in the mandrel coupling rod and the winch assembly axle. In particular embodiments, both the collar of the mandrel coupling rod and the end of the winch assembly axle include shear pin holes through which the shear pin may be inserted and engaged. When the shear pin is engaged, the mandrel coupling rod and the winch assembly axle may be coupled together and force is transmitted from winch assembly 70 through mandrel assembly 50 to strap assembly 40. When the shear pin is broken (e.g. with a shearing force), or otherwise disengaged from at least one of winch assembly 70 and mandrel assembly 50, the mandrel coupling rod and the winch assembly axle decouple and mandrel 50 may release a tension applied to strap assembly 40. One or more of the thickness and strength of the rod of the shear pin may be changed to obtain a particular release threshold (e.g. breakaway, shearing, or release strength).

For example, a ⅛ inch shear pin is used to restrain a light vehicle during a high impact collision at over 8 mph. The shear pin strength and width may be selected to break during collisions over 6-10 mph. A larger vehicle may require a shear pin with higher strength in order to restrain the vehicle for the same range. In another embodiment, a shear pin is selected such that the shear pin breaks during a collision at over 4 mph.

In another embodiment, a ⅛ inch grade 8 shear pin may withstand a force of up to 9 inch pounds (in lbs). In another example, a shear pin may withstand 6-12 in lbs before shearing. In still a further example, the shear pin may withstand up to 20 in lbs of force before shearing.

The shear pin may be replaced to modify the release threshold of vehicle restraint system 10. In one example, the shear pin is inexpensive and readily replaced by pressing out the ends of the installed shear pin (e.g. broken or unbroken) and inserting a new shear pin. Release mechanism 60 may include alignment holes formed therein, which are disposed adjacent to the shear pin holes and assist in aligning the shear pin holes of the mandrel coupling rod and the winch assembly axle.

One or more of other torque limiting, force limiting, and disconnecting devices may be employed in release mechanism 60 in lieu of a shear pin (e.g., a friction plate limiter or ball detent disconnect). Such other devices may employ coupling rods, or, alternatively, may be disposed directly adjacent to one or more of winch assembly 70 and mandrel assembly 50. For example, release mechanism 60 may be a friction limiting plate that is disposed between one or more coupling rods in release mechanism 60 and is coupled to an end of each of the one or more coupling rods. Extreme forces produced while transporting vehicle 30 are dissipated by one or more of the torque limiting, force limiting, and disconnecting devices, which allows strap assembly 40 to loosen.

Certain configurations may not employ coupling rods, but may employ a torque limiting device directly between mandrel assembly 50 and winch assembly 70. Further configurations may include magnetic based torque limiting devices. Still other configurations may include torque limiting devices that give way, but do not break or shear when the predetermined force threshold is reached.

Other embodiments may not have coupling rods in release mechanism 60 or may include a winch coupling rod coupled directly to winch assembly 70 with release mechanism 60 disposed between the winch coupling rod and the mandrel assembly axle. Another configuration includes release mechanism 60 disposed in any other elements of the disclosure. Any combination of the above examples may be used in connection with the disclosure.

Figure 2:
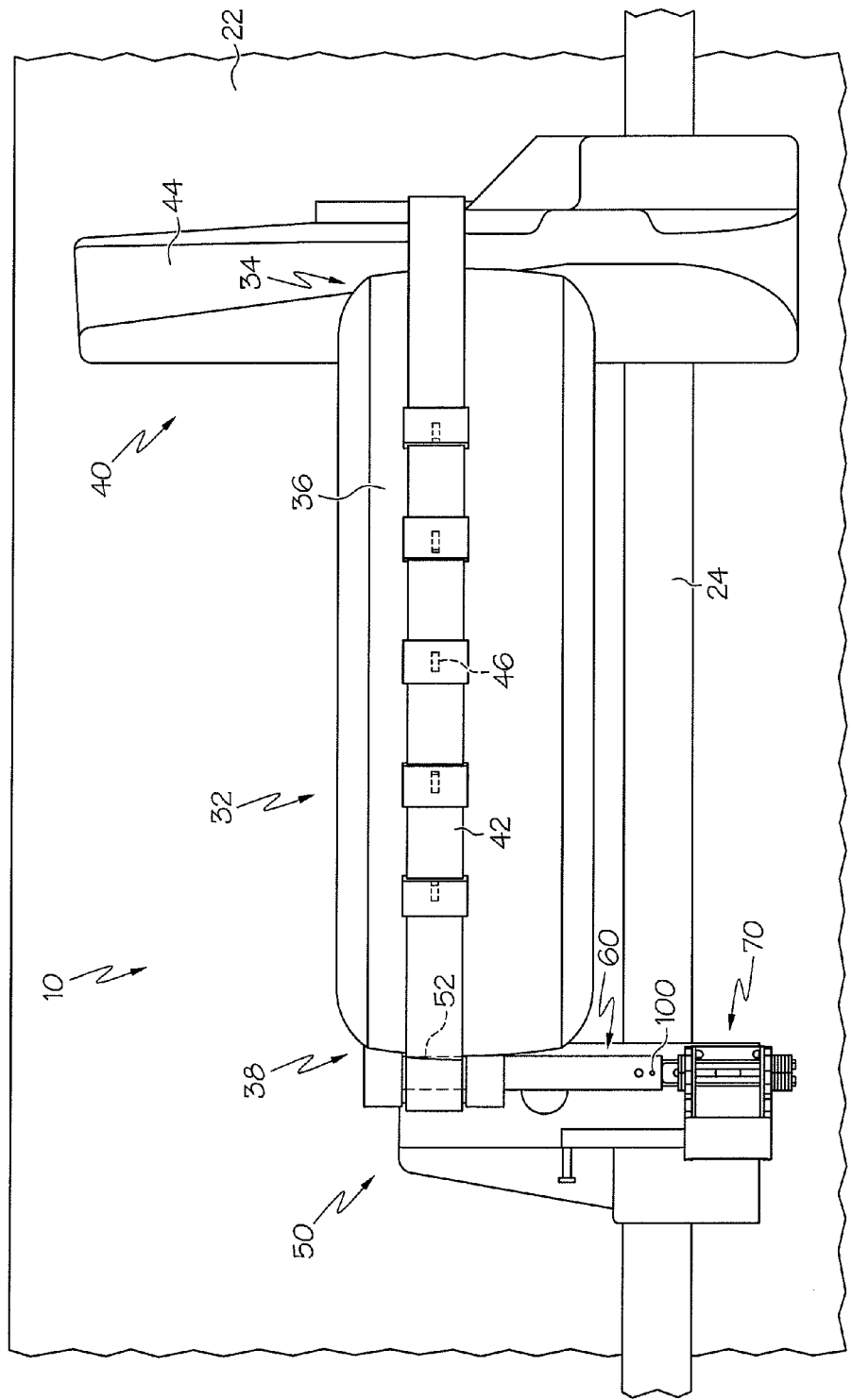
FIG. 2 illustrates a top view of the vehicle restraint system of FIG. 1A.

FIG. 2 illustrates a top view of vehicle restraint system 10 of FIG. 1A. Vehicle restraint system 10 may include strap assembly 40, mandrel assembly 50, winch assembly 70, and release mechanism 60. In the illustrated configuration, a railway car (i.e., transport) transports one or more vehicles that each have one or more tires 32 restrained by vehicle restraint system 10. Strap assembly 40 is coupled to deck 22 of the transport on first side 34 of tire 32. First side 34 refers to one or more of the inboard and outboard sides of tire 32. Strap assembly 40 is coupled to mandrel assembly 50. Mandrel assembly 50 and winch assembly 70 is coupled to deck 22 of the transport on second side 38 of tire 32. Second side 38 refers to one or more of the inboard or outboard side of tire 32. Strap assembly 40 is tightened around one or more portions 36 of tire 32 through mandrel assembly 50 by winch assembly 70. Release mechanism 60 couples winch assembly 70 to mandrel assembly 50, and releases the coupling between winch assembly 70 and mandrel assembly 50 when a predetermined threshold force is exceeded between winch assembly 70 and mandrel assembly 50.

Vehicle restraint system 10 may restrain a vehicle during shipping operations when winch assembly 70 tightens strap assembly 40 around a portion of tire 32 through mandrel assembly 50. For example, one or more of mandrel assembly 50, release mechanism 60, and winch assembly 70 is coupled to deck 22 of transport 20. The risk of damage caused by vehicle restraint system 10 on the body of vehicle 30 when vehicle 30 is released may be decreased by disposing winch assembly 70 outside the envelope of vehicle 30. Disposing winch assembly 70 outside the envelope of vehicle 30 may allow winch assembly 70 to be manually operated, since there may be more room to operate winch assembly 70.

Vehicle restraint system 10 may prevent latent damage to the suspension of vehicle 30. In a particular example, winch assembly 70 tightens strap assembly 40 through mandrel assembly 50 and releases the coupling between mandrel assembly 50 and winch assembly 70 during a sudden movement or force caused by the transport that exceeds a predetermined threshold set in release mechanism 60. Vehicle restraint system 10 may prevent latent damage to suspension of vehicle 30 releasing the coupling between mandrel assembly 50 and winch assembly 70. Release mechanism 60 allows for configurable release thresholds depending on the strength of the suspension of vehicle 30. In certain configurations, tightening a bolt on a friction plate release mechanism increases the force threshold. In other configurations, replacing a shear pin 100 with a stronger shear pin increases the force threshold. Release mechanism 60 may allow for consistent release thresholds, so that vehicle 30 is not released at forces below the desired threshold.

The transport may include one or more of a railroad car, truck, boat, airplane, and other machine suitable for transporting one or more vehicles. In certain configurations, the transport is a tri-level railroad car comprising three decks, such that each deck can transport one or more vehicles. The vehicle in the above configuration refers to one or more of an automobile, truck, jeep, or any machine having one or more tires 32. In certain configurations, the transport includes an anchor rail 24 coupled to deck 22 of the transport. Anchor rail 24 may be disposed parallel to vehicle tire 32, which enables vehicle restraint system 10 to be coupled to deck 22 of the transport.

Strap assembly 40 may comprise a strap assembly belt 42 and a strap assembly anchor chock 44. For example, strap assembly anchor chock 44 is coupled to one end of strap assembly belt 42, and is coupled to anchor rail 24. Strap assembly anchor chock 44 is disposed flush against tire 32 tread and may statically restrain tire 32. Strap assembly belt 42 is coupled to mandrel assembly 50. Mandrel assembly 50 is disposed such that strap assembly belt 42 may be disposed flush against tire 32 tread, and is coupled to anchor rail 24. Winch assembly 70 tightens strap assembly belt 42 around tire 32 tread through release mechanism 60 and through mandrel assembly 50. Winch assembly 70 releases the tension in strap assembly belt 42. Vehicle restraint system 10 may be disengaged from vehicle 30 such that vehicle 30 may be unloaded from transport 20. Strap assembly anchor chock 44 is disposed on one or more of inboard or outboard sides of tire 32. Mandrel assembly 50 is disposed on one or more of inboard or outboard sides of tire 32. In certain configurations, mandrel assembly 50, winch assembly 70, and release mechanism 60 are coupled to an anchor chock. The anchor chock is disposed beneath mandrel assembly 50, winch assembly 70 and release mechanism 60.

In certain embodiments, strap assembly belt 42 includes cleats 46 which may fit inside the treads of tire 32. Such cleats may provide traction between tire 32 and strap assembly belt 42 when vehicle 30 shifts/changes positions in the transport. Cleats 46 may further translate forces between strap assembly belt 42 and tire 32.

The transport experiences external forces during the normal course of shipping. These external forces may caused by one or more of acceleration and deceleration, coupling and decoupling, transport failure, collisions with trains, vehicles, railway buffer stops, docks, vessels, and turbulence. For example, one or more of these external forces may move the vehicle from its static position on deck 22. As the vehicle moves, tire 32 rotates and skids across deck 22 surface. One or more of tire 32 rotation and skidding produces a force counter to the restraining force applied by winch assembly 70. Such counter-force may be relayed through mandrel assembly 50 and release mechanism 60 to winch assembly 70. Such counter-force may be greater than the predetermined threshold of release mechanism 60. Release mechanism 60 may release the coupling between winch assembly 70 and mandrel assembly 50, such that mandrel assembly axle 52 rotates freely and strap assembly 40 unwinds. When strap assembly 40 coupling is released from mandrel assembly 50, vehicle restraint system 10 may allow tire 32 to one or more of roll and skid. Vehicle restraint system 10 may allow tire 32 and the vehicle to move without restraint and can release the load or force of a collision from the suspension of the vehicle. In such an example, vehicle restraint system 10 may prevent latent damage to the suspension of the vehicle.

Vehicle restraint system 10 may be configured to employ one or more of anchor chocks and belts that may be present in the field. For example, vehicle restraint system 10 is configured with anchor chocks and belts that other manufacturers produce. In certain configurations, an existing belt is fed through mandrel assembly 50 and is coupled to mandrel assembly 50 for restraining tire 32. The existing belt is employed as strap assembly belt 42. The existing anchor chock is employed as strap assembly anchor chock 44. Existing anchor chocks and straps replace strap assembly 40 in the given example. Existing anchor chocks and straps may be readily available in the field, and such use may save users of traditional vehicle restraint systems replacement costs by enabling re-use of existing equipment in vehicle restraint system 10.

In certain configurations, vehicle restraint system 10 may be configured on only one side of the vehicle. Such configurations may save installation time and prevent possible damage from operator installation on one or more sides. Extending winch assembly 70 outside the envelope of the vehicle may prevent damage to body of the vehicle from operator installation.

In certain configurations, vehicle restraint system 10 is configured to employ industry standard sized straps. Small straps may be vulnerable to edge tears, abrasion and wear, and may be susceptible to unreliable breaking tolerances. Additionally, required vehicle height clearance may not increase by use of vehicle restraint system 10 because strap assembly 40 may hug tire 32 tread. For example, because strap assembly 40 holds the vehicle in place, a high impact collision may not subject the vehicle to roof damage from scraping the top of the transport.

Figure 3A:
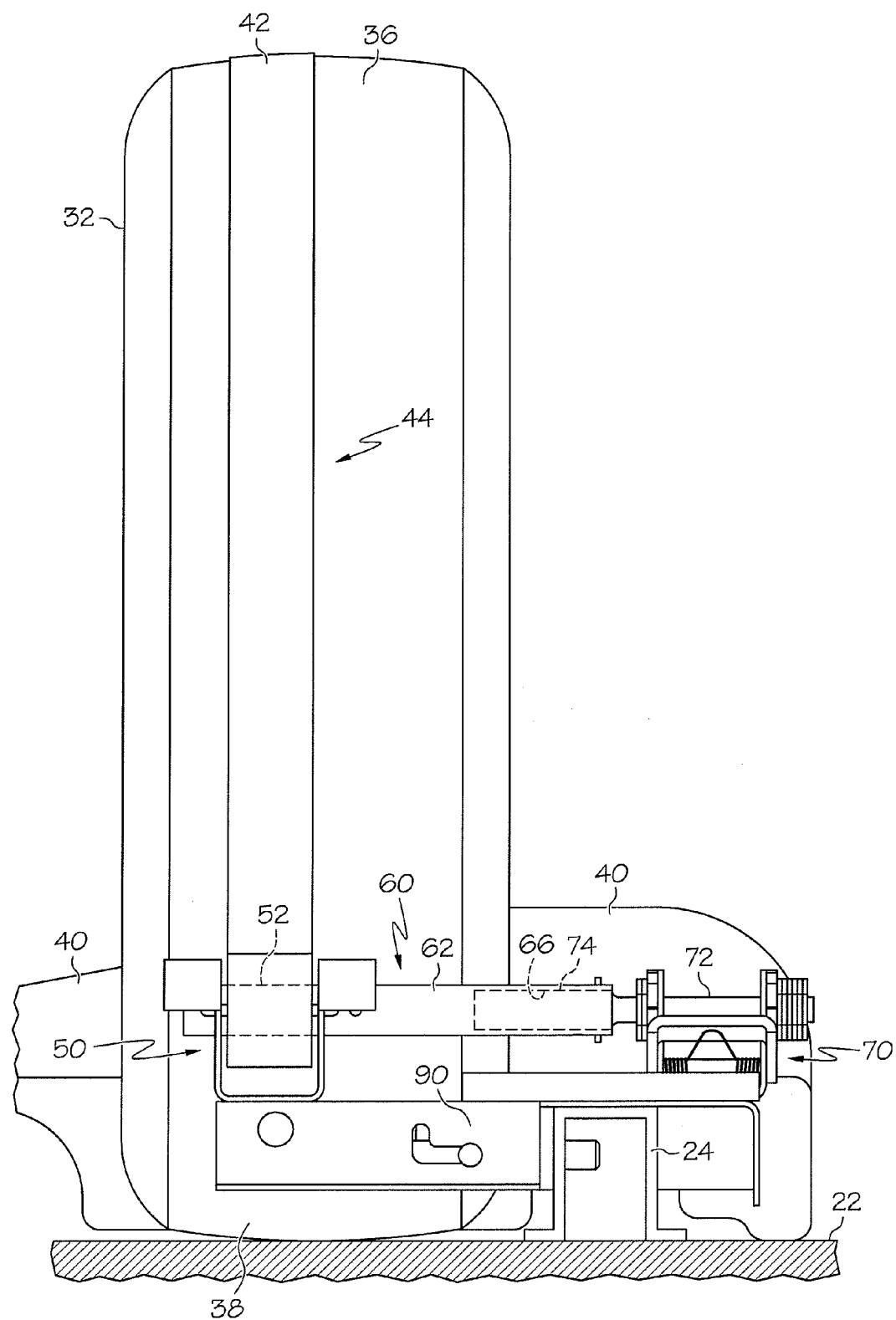
FIG. 3A illustrates a front view of the vehicle restraint system of FIG. 1A.
Figure 3B:
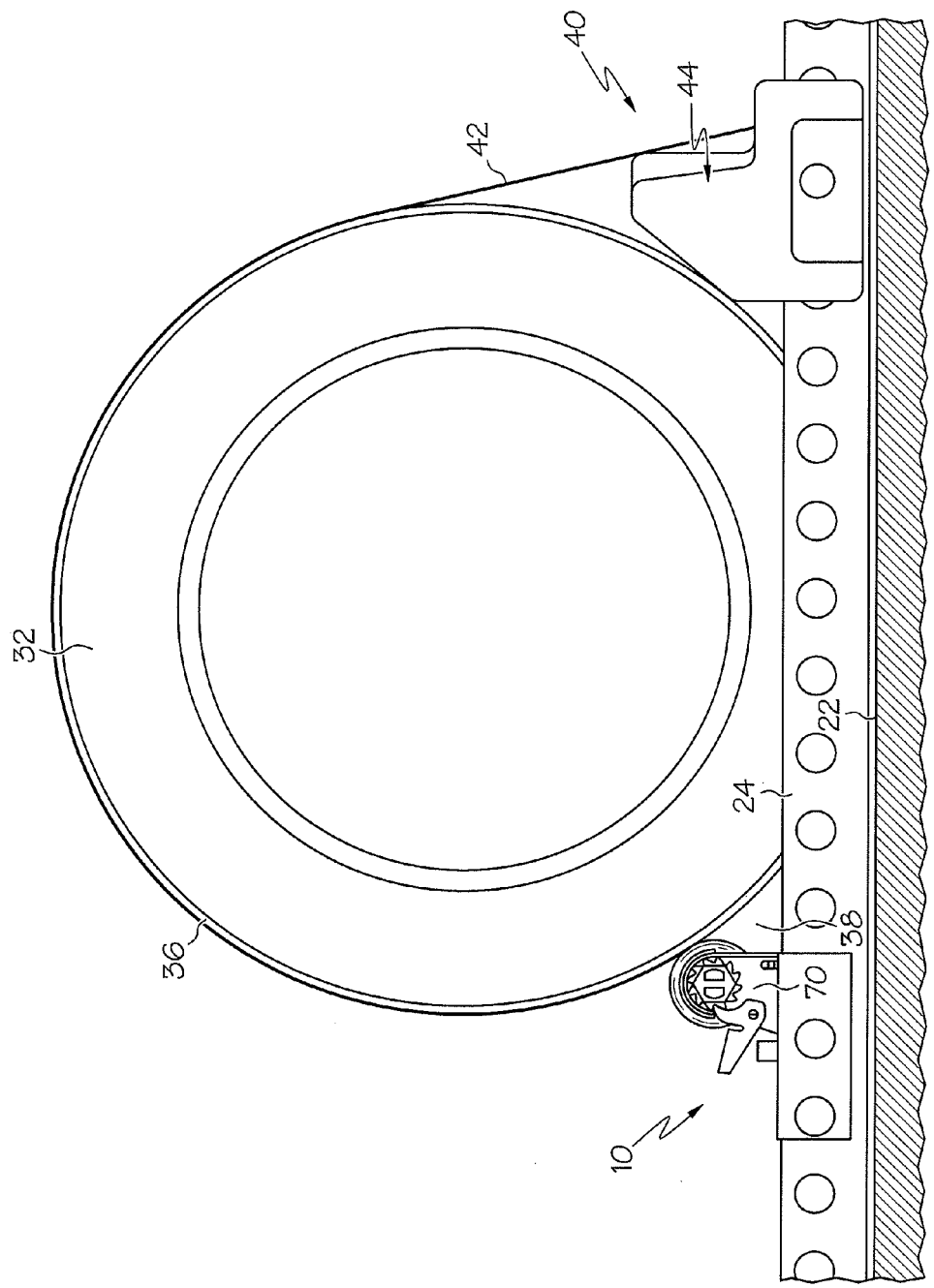
FIG. 3B illustrates a side view of the vehicle restraint system of FIG. 1A.

FIG. 3A illustrates a front view of vehicle restraint system 10 of FIG. 1A, and FIG. 3B illustrates a side view of the vehicle restraint system 10 of FIG. 1A. Referring to FIGS. 3A and 3B, tire 32 of a vehicle may be restrained by strap assembly 40. In the illustrated embodiment, strap assembly 40 is coupled to deck rail 24 of a transport, such that a strap assembly belt 42 is disposed flush against tire 32. Strap assembly belt 42 is disposed central to tire 32 tread, around portion 36 of the circumference of tire 32. Strap assembly belt 42 is coupled to mandrel assembly 50. Mandrel assembly 50 is disposed on an opposite side 38 of tire 32 from a strap assembly anchor chock 44. A winch assembly 70 is positioned on an outboard side of vehicle 30. Mandrel assembly 50 includes a mandrel assembly axle 52. Winch assembly 70 includes a winch assembly axle 72. Mandrel assembly axle 52 and winch assembly axle 72 may be disposed two inches vertically upwards from an anchor rod 90. Anchor rod 90 couples mandrel assembly 50 and winch assembly 70 to deck rail 24.

Winch assembly 70 may be operable to tighten strap assembly 40, such that tire 32 may be statically restrained. By placing winch assembly 70 outside the envelope of vehicle 30, winch assembly 70 may be more conveniently operated than when winch assembly is disposed directly under tire 32 or under the body of vehicle 30.

Release mechanism 60 may include a mandrel coupling rod 62 and a torque limiter 74. In the illustrated configuration, mandrel coupling rod 62 is disposed adjacent to mandrel assembly axle 52 and is disposed adjacent to winch assembly axle 72. Mandrel coupling rod 62 couples mandrel assembly axle 52 and winch assembly axle 72. One or more bolts couple mandrel coupling rod 62 to mandrel assembly axle 52 and winch assembly axle 72. In certain configurations, mandrel coupling rod 62 is welded to mandrel assembly axle 52 and winch assembly axle 72. The distance between winch assembly 70 and the envelope of vehicle 30 may be increased or decreased by lengthening or shortening mandrel coupling rod 62. The diameter of mandrel coupling rod 62 may be greater in diameter than winch assembly axle 72 such that mandrel coupling rod 62 fits around the outside of winch assembly axle 72 and mandrel coupling rod 62 overlays outside of winch assembly axle 72. When overlaid, Mandrel coupling rod 62 and winch assembly axle 72 rotate freely, independent of each other. Oil or grease may be applied to an external wall 74 of winch assembly axle 72 and an internal wall 66 of mandrel coupling rod 62 such that mandrel coupling rod 62 and winch assembly axle rotate freely when overlaid.

Release mechanism 60 may include a torque limiter 64. In certain configurations torque limiter 64 comprises a shear pin 100 pressed through holes formed in mandrel coupling rod 62 and winch assembly axle, as illustrated in FIGS. 4A and 4B.

Figure 4A:
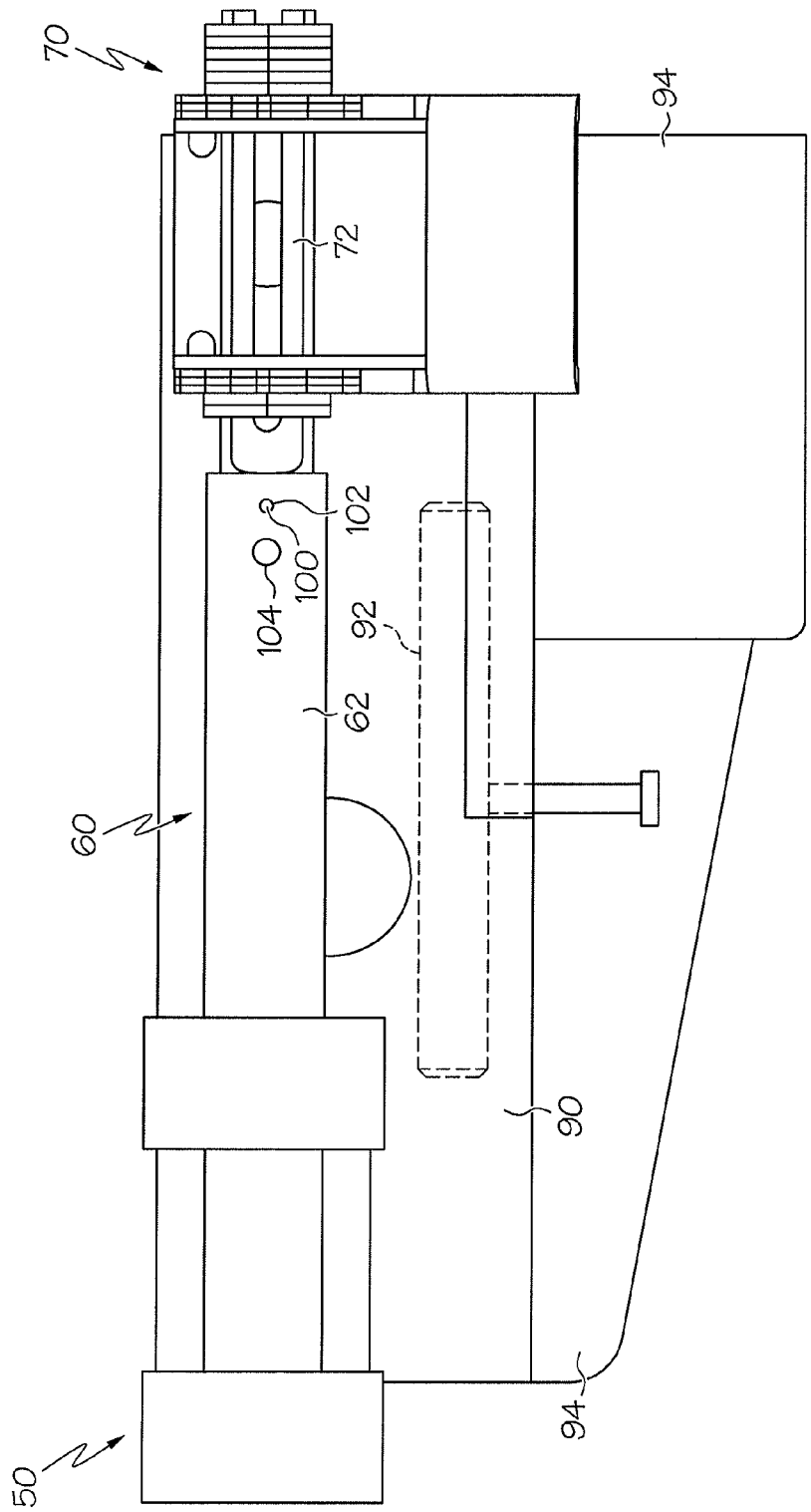
FIG. 4A illustrates a top view of a mandrel assembly, a winch assembly, and a release mechanism in the vehicle restraint system of FIG. 1A.
Figure 4B:
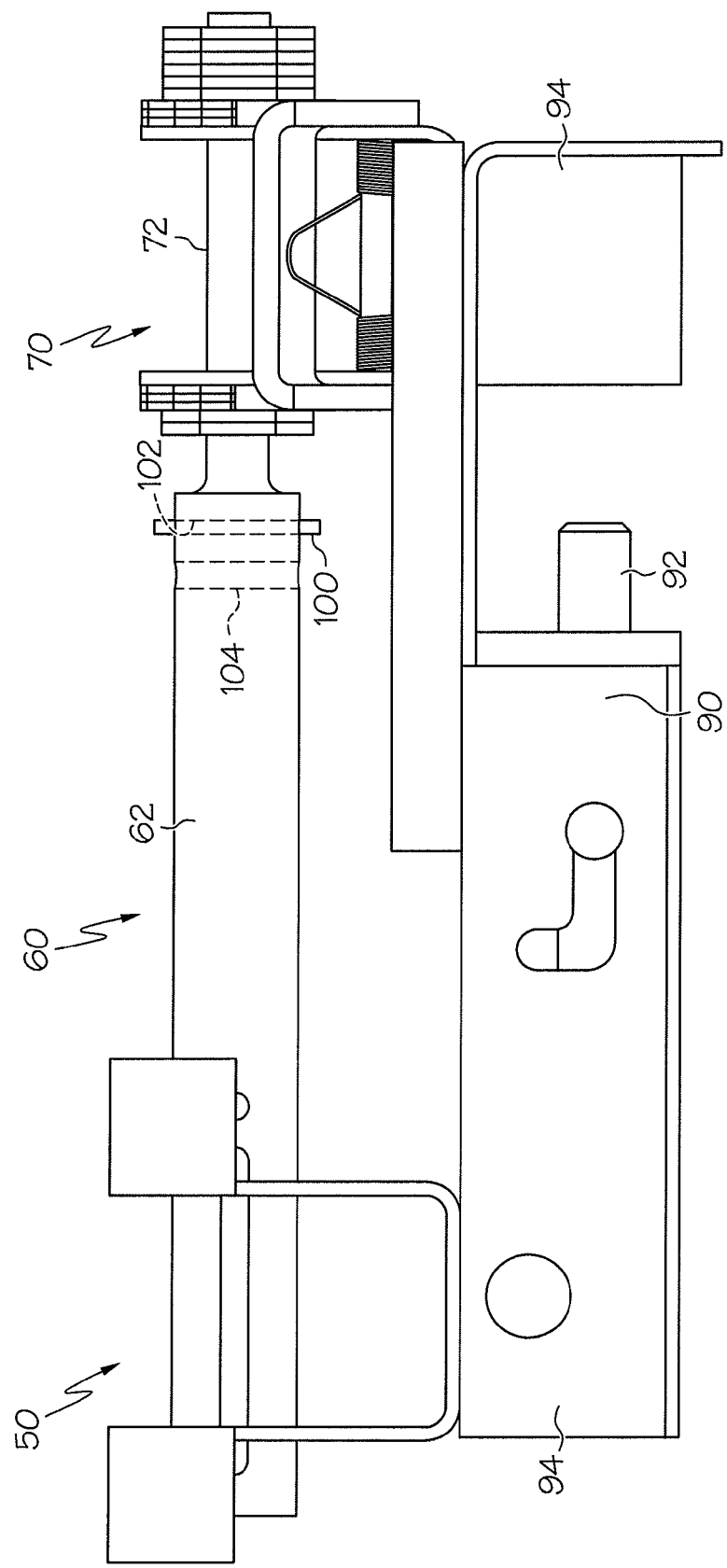
FIG. 4B illustrates a front view of the mandrel assembly, the winch assembly, and the release mechanism in the vehicle restraint system of FIG. 1A.

FIG. 4A illustrates a top view of mandrel assembly 50, winch assembly 70, and release mechanism 60 in vehicle restraint system 10 of FIG. 1A. FIG. 4B illustrates a side view of a mandrel assembly 50, a winch assembly 70, and a release mechanism 60 in vehicle restraint system 10 of FIG. 1A. Shear pin holes 102 formed in mandrel coupling rod 62 are cut through the diameter of mandrel coupling rod 62 and winch assembly axle 72 along the overlapping portion 80 of mandrel coupling rod 62 and winch assembly axle 72, such that a shear pin 100 may be pressed through one set of shear pin holes 102 in mandrel coupling rod 62 and winch assembly axle 72, through the diameter of mandrel coupling rod 62 and winch assembly axle 72, and out the opposing set of shear pin holes 102 formed in mandrel coupling rod 62 and winch assembly axle 72. When shear pin 100 is pressed through both sides of mandrel coupling rod 62 and winch assembly axle 72, mandrel assembly 50 and winch assembly 70 may be coupled together. Mandrel coupling rod 62 and winch assembly axle 72 include alignment holes 104 to guide shear pin 100 insertion. For example, alignment holes 104 are ¼ inch in diameter, and are disposed adjacent to shear pin holes 102 in one or more of mandrel coupling rod 62 and winch assembly axle 72, while shear pin holes 102 have ⅛ inch diameter.

Shear pin 100 may be selected such that it may shear when a torque greater than a predefined torque is reached between mandrel coupling rod 62 and winch assembly axle 72. The predetermined shearing force of shear pin 100 may correspond to the force exerted on a strap assembly by a tire during an impact at eight miles per hour. The shear pin setting may restrain vehicles during low impact collisions, while protecting vehicle suspensions from damage during high impact collisions. Shear pin 100 may include 1⅛ inches in length such that shear pin 100 may extend through one or more sides of mandrel coupling rod 62 and winch assembly axle 72.

Shear pin 100 may be selected such that it shears at different torques depending on the weight of the vehicle. Shear pin 100 may be replaced by pushing out sheared halves of shear pin 100, realigning alignment holes 104 and replacing broken shear pin 100 with a new shear pin.

Mandrel assembly 50 and winch assembly 70 may be disposed on opposite ends 94 of deck rail anchor rod 90. For example, deck rail anchor rod 90 couples mandrel assembly 50 and winch assembly 70 to a deck of a railway car. Deck rail anchor rod 90 is coupled to deck rail 24 by means of a spring-loaded bolt 92. Deck rail anchor rod 90 is disposed perpendicular to the anchor rail.

Figure 4D:
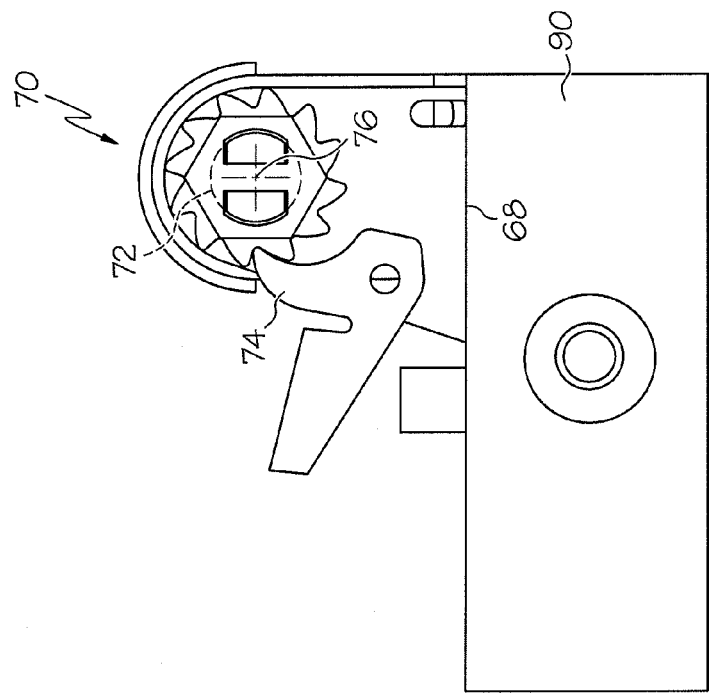
FIG. 4D illustrates a side view of the winch assembly in the vehicle restraint system of FIG. 1A.
Figure 4C:
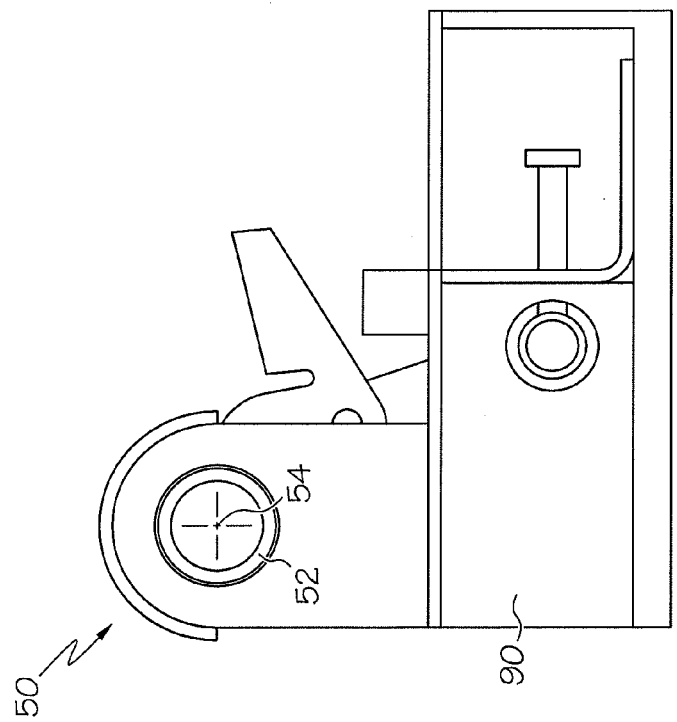
FIG. 4C illustrates a side view of the mandrel assembly in the vehicle restraint system of FIG. 1A.

FIG. 4C illustrates a side view of a mandrel assembly 50 in vehicle restraint system 10 of FIG. 1A. In the depicted embodiment, a strap assembly is coupled to mandrel assembly 50 at mandrel assembly axle 52. Mandrel assembly axle 52 rotates when a winch assembly axle is rotated. Rotation of mandrel assembly axle 52 tightens the strap assembly belt around a tire. Mandrel assembly 50 is coupled to the deck of the transport by an anchor rod 90 that extends parallel to a transport deck. Anchor rod 90 extends perpendicular to a deck rail. Anchor rod 90 is coupled to the deck rail. Mandrel assembly axle 52 rotates freely when the release mechanism is decoupled. Mandrel assembly 50 is coupled to anchor rod 90 by means of a shoulder bolt and a ⅝ inch nut. The shoulder bolt may be disposed downward through the center of mandrel assembly 50 through the top of anchor rod 90 and may be secured with the nut. Mandrel assembly axle 52 may be disposed so that center point 54 of mandrel assembly axle 52 is two inches above anchor rod 90.

FIG. 4D illustrates a side view of winch assembly 70 in vehicle restraint system 10 of FIG. 1A. Winch assembly 70 may be coupled to the deck of the transport through anchor rod 90. In one embodiment, winch assembly 70 tightens the strap assembly around the tire. Winch assembly 70 includes ratchet pawls 74 that may lock rotation of winch assembly axle 72. Winch assembly 70 may not release the tightening force unless ratchet pawls 74 have been disengaged. Ratchet pawls 74 are configured such that a downward force rotates winch assembly axle 72 and tightens the strap assembly. Winch assembly 70 is operable to tighten the strap assembly, such that the tires of the vehicle are restrained properly to reduce the risk of movement of the vehicle from a sudden movement or force. Winch assembly 70 may be manually operated and/or operated with a wrench. Winch assembly 70 may include winch assembly axle 72 disposed such that center point 76 of winch assembly axle 72 may be disposed two inches above anchor rod 90. Winch assembly 70 may be coupled to anchor rod 90 by means of a shoulder bolt and a ⅝ inch nut. The shoulder bolt may be disposed downward through the center 68 of winch assembly 70 through the top of anchor rod 90, and may be secured with the nut.

Passenger vehicles, sport utility vehicles (SUV), crossover vehicles, mini-vans, and light trucks will have lighter suspensions, in order to save weight and increase fuel economy. The current suspensions for such vehicles, however, are strong enough to withstand an over speed impact of railcars when strapped to the anchor chocks/deck of a rail car. Future vehicle suspensions may be built lighter for fuel savings and may yield from an over speed impact, which may cause miss alignments and possible catastrophic failures after being fatigued from normal driving.

Railcars are not to be switched and coupled higher than 4 mph, but over speed impacts sometimes occur over 8 mph. Damaged suspensions are not easily discovered by visual inspection. Such resulting damage is referred to as "latent damage". Accordingly, automakers may desire a tie down system that releases at 8 mph or greater in order to prevent latent damage. Such automakers may be willing to sacrifice visual damage to the vehicles bumpers in such a system.

Certain tie down systems may employ chocks without straps, which may allow the vehicle to roll over them when an over speed impact occurs. But, chocks without straps have to be applied to all four wheels and often require multiple chocks per wheel. Other systems include a smaller strap with a lower breaking strength. The smaller straps may be vulnerable to edge tears, abrasion, and wear. Straps with such conditions will not have reliable breaking strengths and may be expensive to maintain and replace.

System 10 may use a shear pin between a winch assembly and mandrel assembly in order to release a vehicle at higher G impacts. Such a system may be applied to the same side of the vehicle. System 10 may prevent high loads from being transferred into the vehicle's suspension, and may reduce the risk of damage from over speed impact loads. The shear pin may break due to torsion load. The strap in the clevis end may unwind producing slack and freeing the strap. No additional metal will be at the end of the strap that may damage the vehicle's body/wheel well when the shear pin breaks. The tie down strap may hug the tire's tread, and may reduce the clearances required. The strap mandrel location may be against the tire tread.

System 10 may be used with the existing anchor chocks, and only one chock per wheel may need to be replaced. Such a configuration may reduce purchase costs.

Figure 5A:
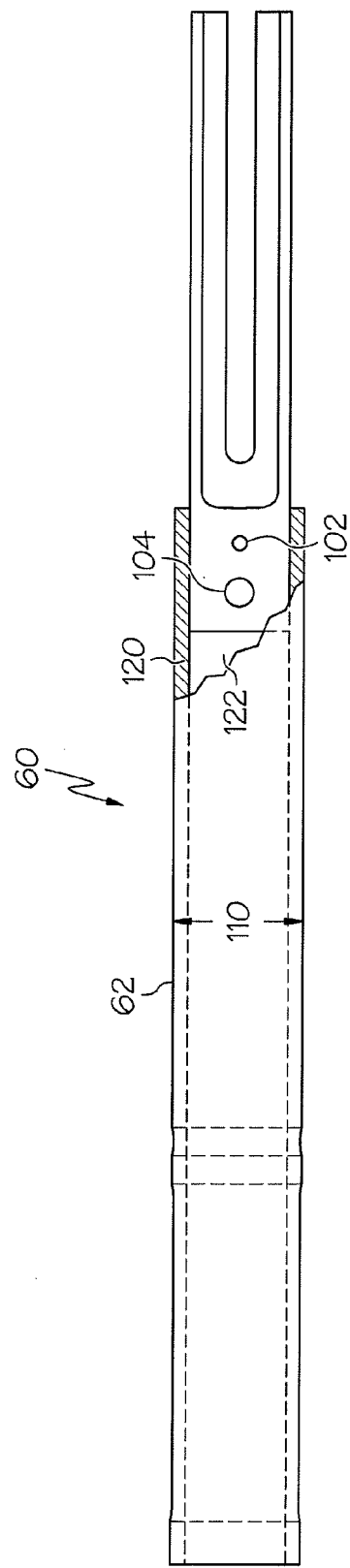
FIG. 5A illustrates a top view of the release mechanism in the vehicle restraint system of FIG. 1A.

FIG. 5A illustrates a top view of release mechanism 60 in vehicle restraint system 10 of FIG. 1A. Release mechanism 60 may include one or more of mandrel coupling rod 62, alignment holes 104, and shear pin holes 102. In certain configurations, mandrel coupling rod 62 is coupled to one end of the mandrel assembly axle, such that when the mandrel assembly axle is rotated, mandrel coupling rod 62 may be rotated. Mandrel coupling rod 62 diameter 110 may be larger than the winch assembly axle diameter, such that the winch assembly axle may fit inside mandrel coupling rod 62. Mandrel coupling rod 62 and the winch assembly axle may be coupled by a torque limiting device, such as a shear pin, such that the torque produced between the mandrel assembly and the winch assembly is released.

Mandrel coupling rod 62 may comprise a collar 120 with a hollow core 122 where the winch assembly axle may be inserted. A shear pin may then be inserted into shear pin holes 102. Shear pin hole 102 alignment is confirmed by aligning alignment holes 104. The shear pin may be pressed through the diameter of both the coupling rod and winch assembly axle. When the shear pin is engaged, the winch assembly may transfer any force up to the predetermined force threshold to the mandrel assembly. In one example, mandrel coupling rod 62 measures 9⅜ inches long and ¾ of an inch wide, and is coupled to a mandrel assembly axle that is 4 inches long.

Mandrel coupling rod 62, the mandrel assembly axle and the winch assembly axle may interact in different ways. For example, the interior of a winch coupling rod or winch axle may be larger in diameter than the exterior of the mandrel coupling rod or axle. The winch coupling rod may be disposed overlaid on the exterior of the mandrel assembly axle. In other configurations, coupling rods and axles may be coupled together by bolts.

Figure 5B:
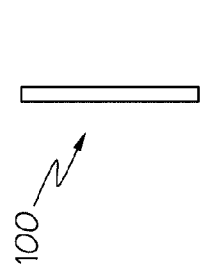
FIG. 5B illustrates a top view of a shear pin in the vehicle restraint system of FIG. 1A.

FIG. 5B illustrates shear pin 100 in vehicle restraint system 10 of FIG. 1A. Shear pin 100 may be inserted through shear pin holes formed in the mandrel coupling rod and the winch assembly axle. The mandrel coupling rod produces a torque against the winch assembly axle by engaging shear pin 100. Shear pin 100 may include a predetermined force threshold. Forces exerted against shear pin 100 that one or more of meet and exceed a predetermined force threshold may break shear pin 100, and allow the mandrel coupling rod to rotate freely. Forces exerted against shear pin 100 may cause the coupling between the mandrel and winch assembly to break.

Different shear pins 100 may withstand different shear thresholds. The shear threshold may equal the force exerted on the shear pin during a collision at eight miles per hour. The shear threshold may equal any force level, depending on the desired behavior. For example, when transporting a truck with a strong suspension, a shear pin with a large shear threshold may be used to restrain the truck. The vehicle restraint system may be adapted for use with trucks by replacing shear pin 100 with a shear pin with a large shear threshold. Shear pin 100 may be replaced repeatedly over the life of vehicle restraint system 10.

FIG. 6 illustrates a front view of a winch assembly 70 in vehicle restraint system 10 of FIG. 1A. Winch assembly 70 may include winch assembly axle 72. Winch assembly axle 72 may comprise one or more of shear pin holes 102 and alignment holes 104 formed on opposite sides 78 of winch assembly axle 72. Alignment holes 104 may align shear pin holes 102 for shear pin installation. The shear pin may be engaged with the winch assembly axle 72 and the mandrel coupling rod during operation. When the force between the mandrel coupling rod and winch assembly axle 72 exceeds a predetermined force threshold, the shear pin may shear, and winch assembly 70 and the mandrel assembly may decouple.

Winch assembly 70 may be manually operated, or may require a wrench to operate. Certain configurations may employ a foot release mechanism. The winch assembly may further be disposed outside the envelope of the vehicle. Winch assembly axle 72 may measure 5½ inches long. Winch assembly axle 72 may extend out a side 130 of ratchet sprockets 80 by 1¼ inches. Winch assembly axle 72 may have ⅛ inch shear pin holes 102 and ¼ inch alignment holes 104 formed in it. Winch assembly axle 72 may bow out to a diameter 132 of 0.87 inches on extended side 130 of ratchet sprockets 80.

Figure 7B:
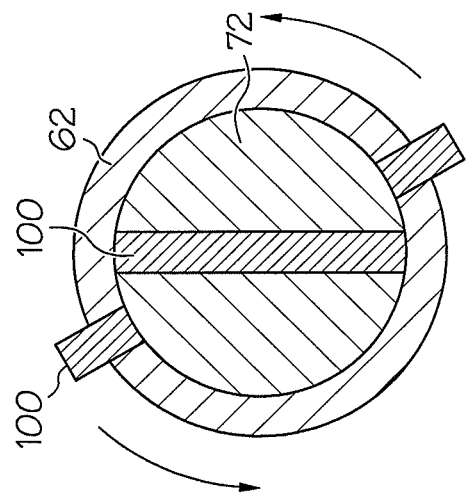
FIG. 7B illustrates a cross section view of the winch assembly axle and the mandrel coupling rod after the predetermined force threshold has been applied against the winch assembly axle in the vehicle restraint system of FIG. 1A.
Figure 7A:
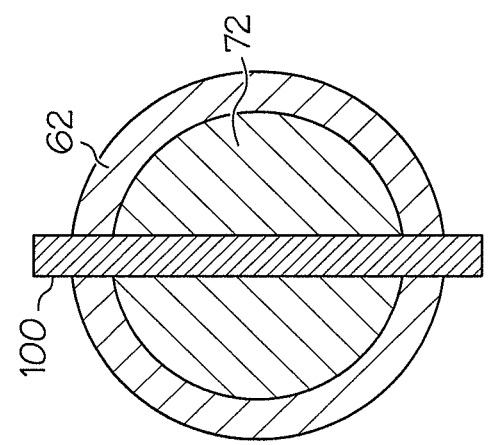
FIG. 7A illustrates a cross section view of a winch assembly axle and a mandrel coupling rod when a force less than the predetermined force threshold is applied against winch assembly axle in the vehicle restraint system of FIG. 1A.

FIG. 7A illustrates a cross section view of winch assembly axle 72 and mandrel coupling rod 62 when a force less than the predetermined force threshold is applied against winch assembly axle 72 in vehicle restraint system 10 of FIG. 1A. FIG. 7B illustrates a cross section view of winch assembly axle 72 and mandrel coupling rod 62 after the predetermined force threshold has been applied against winch assembly axle 72 in vehicle restraint system 10 of FIG. 1A. For example, when the force between mandrel coupling rod 62 and winch assembly axle 72 is below the predetermined force threshold (e.g. the shear pin strength) shear pin 100 transfers the force from the winch assembly to the mandrel assembly as indicated in FIG. 7A. When the force threshold is one or more of reached and exceeded, mandrel coupling rod 62 breaks shear pin 100 and mandrel coupling rod 62 rotates freely as indicated in FIG. 7B.

Figure 8:
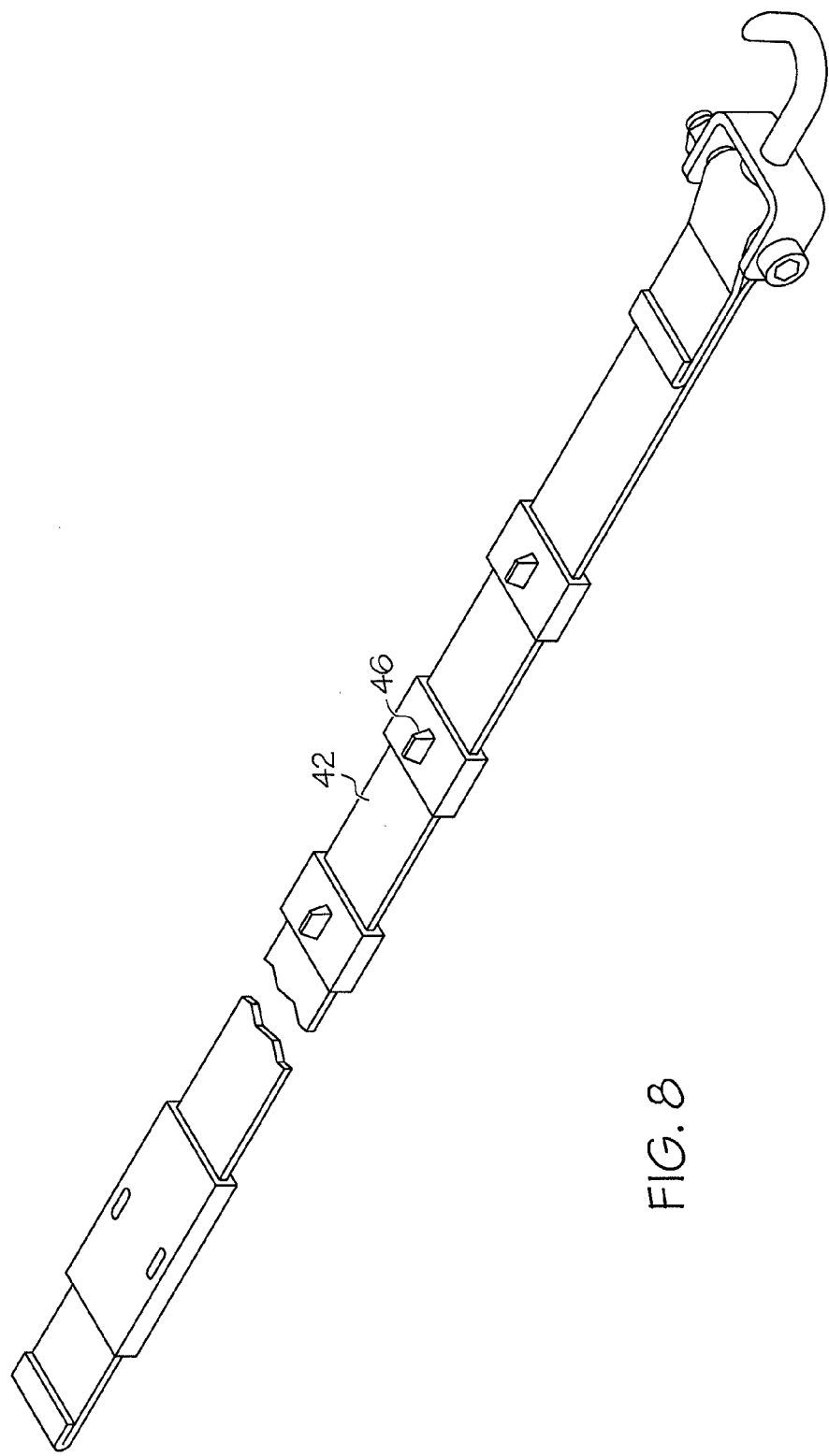
FIG. 8 illustrates a belt from a strap assembly.

FIG. 8 illustrates a belt from a strap assembly, like belt 42 in vehicle restraint system 10 of FIG. 1A. Belt 42 may be wrapped around a portion of a tire and secured at both ends, thus securing the tire to the deck of a transport in accordance with vehicle restraint system 10. In certain embodiments, belt 42 has cleats 46 that stick into grooves in the treads of the tire in order to restrain the vehicle. Cleats 46 are adjustable such that belt 42 may fit generically on many tire brands and tread patterns. Further, cleats 46 may efficiently transfer forces exerted during impacts through the mandrel assembly.

While the disclosure has been described in connection with various configurations, it will be understood by those of ordinary skill in the art that other variations and modifications of the various configurations described above may be made without departing from the scope of the disclosure. Other configurations will be apparent to those of ordinary skill in the art from a consideration of the specification or practice of the configurations of the disclosure disclosed herein. The specification and the described examples are considered as exemplary only, with the true scope and spirit of the configurations of the disclosure indicated by the following claims.

What is claimed is:

1. A vehicle restraint system, comprising:
a strap assembly configured to be positioned on a portion of a tire of a vehicle to secure the vehicle to a deck of a transport, and configured to be coupled to the deck of the transport on a first side of the tire of the vehicle;
a mandrel assembly operable to be coupled to the strap assembly on a second side of the tire of the vehicle, opposite the first side;
a winch assembly configured to be coupled to the deck of the transport and the mandrel assembly on the second side of the tire of the vehicle, the winch assembly configured to rotate the mandrel assembly to produce a tightening force to tighten the strap assembly around the portion of the tire; and
a release mechanism disposed between the winch assembly and the mandrel assembly and configured to create a coupling between the winch assembly and the mandrel assembly in a manner that transmits the tightening force from the winch assembly to the mandrel assembly to create a tension force in the strap assembly, wherein the release mechanism is configured to release the tension force by releasing the coupling between the winch assembly and the mandrel assembly when a force greater than or equal to a predetermined force is produced against the release mechanism.

2. The system of claim 1, wherein the winch assembly is positioned outside an envelope defined by the vehicle.

3. The system of claim 1, wherein the strap assembly comprises a chock positioned on the deck of the transport on the first side of the tire of the vehicle, the chock configured to secure the vehicle to the deck of the transport.

4. The system of claim 1, wherein the strap assembly comprises cleats positioned in one or more grooves of treads of the tire.

5. The system of claim 1, wherein the winch assembly comprises a chock positioned on the deck of the transport on the second side of the tire of the vehicle, the chock configured to secure the vehicle to the deck of the transport.

6. The system of claim 5, wherein the strap assembly comprises a strap assembly chock positioned on the deck of the transport on the first side of the tire of the vehicle, the strap assembly chock configured to secure the vehicle to the deck of the transport.

7. The system of claim 2, wherein the winch assembly is configured to be operated by hand to tighten the strap assembly around the portion of the tire.

8. The system of claim 1, wherein the winch assembly, mandrel assembly, and release mechanism are configured to be cantilevered to the deck of the transport.

9. The system of claim 3, wherein the winch assembly, mandrel assembly, and release mechanism are configured to be cantilevered to the deck of the transport.

10. The system of claim 1, wherein the strap assembly is configured to be cantilevered to the deck of the transport.

11. The system of claim 1, wherein the release mechanism comprises a shear pin.

12. A vehicle restraint system, comprising:
a mandrel assembly operable to be coupled to a strap assembly on a first side of a tire of a vehicle;
a winch assembly configured to be coupled to a deck of a transport and the mandrel assembly on the first side of the tire, the winch assembly configured to rotate the mandrel assembly to produce a tightening force to tighten the strap assembly around a portion of the tire of the vehicle; and
a release mechanism disposed between the winch assembly and the mandrel assembly and configured to create a coupling between the winch assembly and the mandrel assembly in a manner that transmits the tightening force from the winch assembly to the mandrel assembly to create a tension force in the strap assembly, wherein the release mechanism is configured to release the tension force by releasing the coupling between the winch assembly and the mandrel assembly when a force greater than or equal to a predetermined force is produced against the release mechanism.

13. A vehicle restraint system, comprising:
a strap assembly configured to be positioned on a portion of a tire of a vehicle to secure the vehicle to a deck of a transport, and configured to be coupled to the deck of the transport on a first side of the tire of the vehicle, wherein the strap assembly comprises a first chock positioned on the deck of the transport on the first side of the tire of the vehicle, the first chock configured to secure the vehicle to the deck of the transport;
a mandrel assembly operable to be coupled to the strap assembly on a second side of the tire of the vehicle, opposite the first side;
a winch assembly configured to:
be operated by hand to tighten the strap assembly around the portion of the tire;
be coupled to the deck of the transport and the mandrel assembly on the second side of the tire of the vehicle outside an envelope defined by the vehicle; and
rotate the mandrel assembly to produce a tightening force to tighten the strap assembly around the portion of the tire, the winch assembly comprising a second chock positioned on the deck of the transport on the second side of the tire of the vehicle, the second chock configured to secure the vehicle to the deck of the transport; and
a release mechanism disposed between the winch assembly and the mandrel assembly and configured to create a coupling between the winch assembly and the mandrel assembly in a manner that transmits the tightening force from the winch assembly to the mandrel assembly, wherein the release mechanism is configured to release the coupling between the winch assembly and the mandrel assembly when a force greater than or equal to a predetermined force is produced against the release mechanism and wherein the release mechanism comprises a shear pin.

14. A vehicle restraint system, comprising:

a mandrel assembly operable to be coupled to a strap assembly on a first side of a tire of a vehicle;

a winch assembly configured to:
 be operated by hand to tighten the strap assembly around a portion of the tire;
 be coupled to a deck of a transport and the mandrel assembly on the first side of the tire of the vehicle outside an envelope defined by the vehicle; and
 rotate the mandrel assembly to produce a tightening force to tighten the strap assembly around the portion of the tire, the winch assembly comprising a chock positioned on the deck of the transport on the first side of the tire of the vehicle, the chock configured to secure the vehicle to the deck of the transport; and a release mechanism disposed between the winch assembly and the mandrel assembly and configured to create a coupling between the winch assembly and the mandrel assembly in a manner that transmits the tightening force from the winch assembly to the mandrel assembly, wherein the release mechanism is configured to release the coupling between the winch assembly and the mandrel assembly when a force greater than or equal to a predetermined force is produced against the release mechanism and wherein the release mechanism comprises a shear pin.

* * * * *